US012669867B2

(12) United States Patent       (10) Patent No.:  US 12,669,867 B2
Pai et al.                          (45) Date of Patent:      Jun. 30, 2026

(54) METHOD FOR EYE TRACKING AND EYE TRACKING DEVICE

(71) Applicant: HTC Corporation, Taoyuan City (TW)

(72) Inventors: Li-Chieh Pai, Taoyuan City (TW); Yan-Min Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 0 days.

(21) Appl. No.: 19/203,225

(22) Filed: May 9, 2025

(65) Prior Publication Data

US 2026/0016889 A1      Jan. 15, 2026

Related U.S. Application Data

(60) Provisional application No. 63/671,274, filed on Jul. 15, 2024.

(51) Int. Cl.
*G06F 3/01*       (2006.01)
*G06V 10/82*      (2022.01)
*G06V 40/18*      (2022.01)

(52) U.S. Cl.
CPC .............. *G06F 3/013* (2013.01); *G06V 10/82* (2022.01); *G06V 40/18* (2022.01)

(58) Field of Classification Search
CPC ......... G06F 3/013; G06V 10/82; G06V 40/18
See application file for complete search history.

(56)           References Cited

U.S. PATENT DOCUMENTS

| | | | | |
|---|---|---|---|---|
| 8,289,313 | B2 * | 10/2012 | Lee ...................... | G09G 3/3233 |
| | | | | 315/169.3 |
| 9,405,364 | B2 * | 8/2016 | Hansen ..................... | G06T 7/73 |
| 9,924,865 | B2 * | 3/2018 | Alnajar ................... | G06F 17/18 |
| 10,304,209 | B2 * | 5/2019 | Alonso ..................... | G06T 7/74 |
| 10,594,974 | B2 * | 3/2020 | Ivarsson ................ | H04N 23/56 |
| 11,238,340 | B1 * | 2/2022 | Anderson ............... | G06F 3/013 |
| 11,435,820 | B1 * | 9/2022 | Hirsh .................... | G06F 3/0346 |
| 11,442,539 | B2 * | 9/2022 | Gebauer ................ | G06F 3/013 |
| 11,619,990 | B2 * | 4/2023 | Rosell ...................... | G06T 7/74 |
| | | | | 382/103 |
| 11,635,802 | B2 * | 4/2023 | Stafford ................. | H04N 23/20 |
| | | | | 348/164 |
| 11,769,159 | B2 * | 9/2023 | Chaudhuri ........... | G06N 3/0464 |
| | | | | 705/7.29 |
| 11,861,873 | B2 * | 1/2024 | Gebauer .............. | G06V 10/454 |
| 12,405,660 | B2 * | 9/2025 | Stengel ................... | G06F 3/013 |
| 12,474,770 | B2 * | 11/2025 | Debrunner .......... | G06N 3/0495 |
| 12,530,077 | B2 * | 1/2026 | Zhang ..................... | G06F 3/013 |
| 2010/0164847 | A1 * | 7/2010 | Lee ...................... | G09G 3/3233 |
| | | | | 345/77 |

(Continued)

FOREIGN PATENT DOCUMENTS

CN        115053047 A       9/2022

OTHER PUBLICATIONS

"Office Action of Taiwan counterpart Application", issued on Sep. 19, 2025, p. 1-p. 5.

*Primary Examiner* — Michael J Jansen, II

(74) *Attorney, Agent, or Firm* — JCIPRNET

(57)           ABSTRACT

An eye tracking device and a method for eye tracking are provided. The method includes: obtaining an eye image set; inputting the eye image set to a machine learning model to obtain an estimated eye image; and performing eye tracking according to the estimated eye image.

8 Claims, 5 Drawing Sheets

(56)　　　　　　References Cited

U.S. PATENT DOCUMENTS

| | | | | |
|---|---|---|---|---|
| 2014/0002349 A1* | 1/2014 | Hansen | G06T 7/246 | |
| | | | | 345/156 |
| 2016/0029883 A1* | 2/2016 | Cox | G06V 40/19 | |
| | | | | 351/209 |
| 2017/0007118 A1* | 1/2017 | Alnajar | G06F 17/18 | |
| 2018/0270436 A1* | 9/2018 | Ivarsson | H04N 25/131 | |
| 2018/0308252 A1* | 10/2018 | Alonso | G06T 7/74 | |
| 2020/0257358 A1* | 8/2020 | Rosell | G06T 7/74 | |
| 2020/0279279 A1* | 9/2020 | Chaudhuri | G06F 40/295 | |
| 2020/0348755 A1* | 11/2020 | Gebauer | G06V 10/764 | |
| 2021/0216133 A1* | 7/2021 | Stafford | G02B 27/0179 | |
| 2021/0350550 A1* | 11/2021 | Stengel | G06N 3/045 | |
| 2023/0136669 A1* | 5/2023 | Gebauer | G06V 10/82 | |
| | | | | 345/156 |
| 2023/0266818 A1* | 8/2023 | Debrunner | G06N 3/09 | |
| | | | | 382/103 |
| 2023/0359273 A1* | 11/2023 | Zhang | G06F 3/013 | |

* cited by examiner obtaining an eye image set ⟋ S501 inputting the eye image set to a machine learning model to obtain an estimated eye image ⟋ S502 performing eye tracking according to the estimated eye image ⟋ S503

METHOD FOR EYE TRACKING AND EYE TRACKING DEVICE

CROSS-REFERENCE TO RELATED APPLICATION

This application claims the priority benefit of U.S. provisional application Ser. No. 63/671,274, filed on Jul. 15, 2024. The entirety of the above-mentioned patent application is hereby incorporated by reference herein and made a part of this specification.

BACKGROUND

Technical Field

The disclosure is related to technology for tracking with gaze detection, and particularly related to a method for eye tracking and an eye tracking device.

Description of Related Art

Eye tracking systems have become an essential component in the development of metaverse-related technologies. Notably, devices like head-mounted display (HMD) integrate eye tracking with gesture recognition to function as a virtual mouse for user interaction. Therefore, improving the accuracy and computational efficiency of eye tracking system is a crucial challenge.

Conventional eye tracking systems rely on capturing eye images using camera, which require significant computation resources. High central processing unit (CPU) utilization can lead to screen lag and may severely impact user experience. Therefore, reducing CPU usage is critical consideration in this field.

On the other hand, hardware instability, automatic exposure adjustments, or momentary tracking failures can result in incomplete eye images. Software limitations such as tracking latency or feature extraction errors may also degrade the output quality of the eye tracking system.

SUMMARY

The disclosure is directed to a method for eye tracking and an eye tracking device.

The present invention is directed to an eye tracking device. The eye tracking device includes a transceiver and a processor. The processor is coupled to the transceiver, wherein the processor is configured to: obtain an eye image set via the transceiver; input the eye image set to a machine learning model to obtain an estimated eye image; and perform eye tracking according to the estimated eye image.

In one embodiment of the present invention, the processor is further configured to: perform interpolation between a first image of the eye image set and the estimated eye image to generate an interpolated eye image; and perform the eye tracking according to the interpolated eye image and the estimated eye image.

In one embodiment of the present invention, the eye image set includes a first eye image corresponding to a first time point and a second eye image corresponding to a second time point different from the first time point.

In one embodiment of the present invention, the processor is further configured to: perform preprocessing on a historical eye image set before training the machine learning model according to the historical eye image set, wherein the preprocessing includes translation, rotation, or shearing.

In one embodiment of the present invention, the machine learning model includes a neural network.

The present invention is directed to a method for eye tracking, including: obtaining an eye image set; inputting the eye image set to a machine learning model to obtain an estimated eye image; and performing eye tracking according to the estimated eye image.

In one embodiment of the present invention, the step of performing the eye tracking according to the estimated eye image including: performing interpolation between a first image of the eye image set and the estimated eye image to generate an interpolated eye image; and performing the eye tracking according to the interpolated eye image and the estimated eye image.

In one embodiment of the present invention, the eye image set includes a first eye image corresponding to a first time point and a second eye image corresponding to a second time point different from the first time point.

In one embodiment of the present invention, the method further including: performing preprocessing on a historical eye image set before training the machine learning model according to the historical eye image set, wherein the preprocessing includes translation, rotation, or shearing.

In one embodiment of the present invention, the machine learning model includes a neural network.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
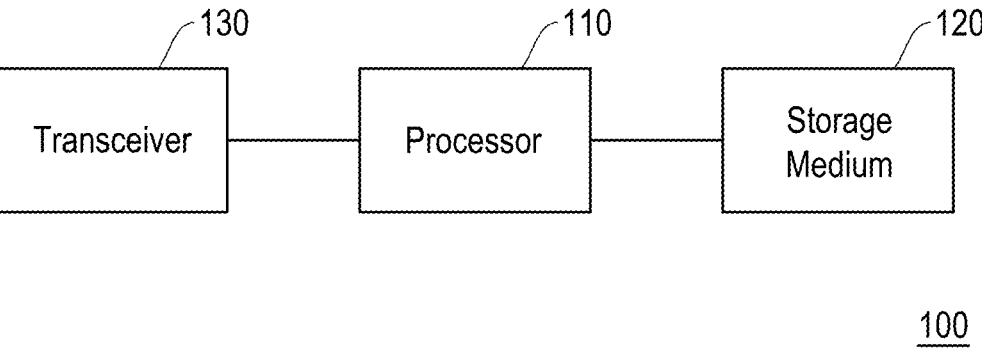
FIG. 1 illustrates a schematic diagram of an eye tracking device according to one embodiment of the present invention.

FIG. 1 illustrates a schematic diagram of an eye tracking device 100 according to one embodiment of the present invention. The eye tracking device 100 may collect images of eyes of a user and track the gaze direction of the user based on the images. The eye tracking device 100 may output commands or signals based on the result of eye tracking. The eye tracking device 100 may include a processor 110, a storage medium 120, and a transceiver 130.

The processor 110 may be, for example, a CPU, or other programmable general purpose or special purpose micro control unit (MCU), a microprocessor, a digital signal processor (DSP), a programmable controller, an application specific integrated circuit (ASIC), a graphics unit (GPU), an arithmetic logic unit (ALU), a complex programmable logic device (CPLD), a field programmable gate array (FPGA), or other similar device or a combination of the above devices. The processor 110 may be coupled to the storage medium 120 and the transceiver 130.

The storage medium 120 may be, for example, any type of fixed or removable random access memory (RAM), read-only memory (ROM), a flash memory, a head disk drive (HDD), a solid state drive (SSD) or similar element, or a combination thereof. The storage medium 120 may be a non-transitory computer readable storage medium configured to record a plurality of executable computer program, modules, or applications to be loaded by the processor 110 to perform the functions of the eye tracking device 100.

The transceiver 130 may be configured to transmit or receive wired/wireless signals. The transceiver 130 may also perform operations such as low noise amplifying, impedance matching, frequency mixing, up or down frequency conversion, filtering amplifying, and so forth. The processor 110 may communicate with other electronic devices (e.g., camera) via the transceiver 130.

In one embodiment, the storage medium 120 may store a machine learning model for estimating eye image based on one or more actual eye images. Specifically, the processor 110 may obtain a historical eye image set via the transceiver 130, wherein the historical eye image set may include one or more historical eye images and a time point (i.e., timestamp) for each historical eye image. The processor 110 may train the machine learning model by using the historical eye image set based on unsupervised learning or supervised learning. In one embodiment, before the machine learning model is trained, the processor 110 may perform preprocessing on each image of the historical eye image set to enhance data diversity of the training data set. The preprocessing may include but not limited to translation, rotation, or shearing.

In one embodiment, the machine learning model may include but not limited to a neural network (e.g., convolution neural network). The advantages of convolutional neural network lie in their faster computation speed, fewer model parameters, and higher platform support. These advantages make convolutional neural networks easier to deploy on mobile devices.

Figure 2:
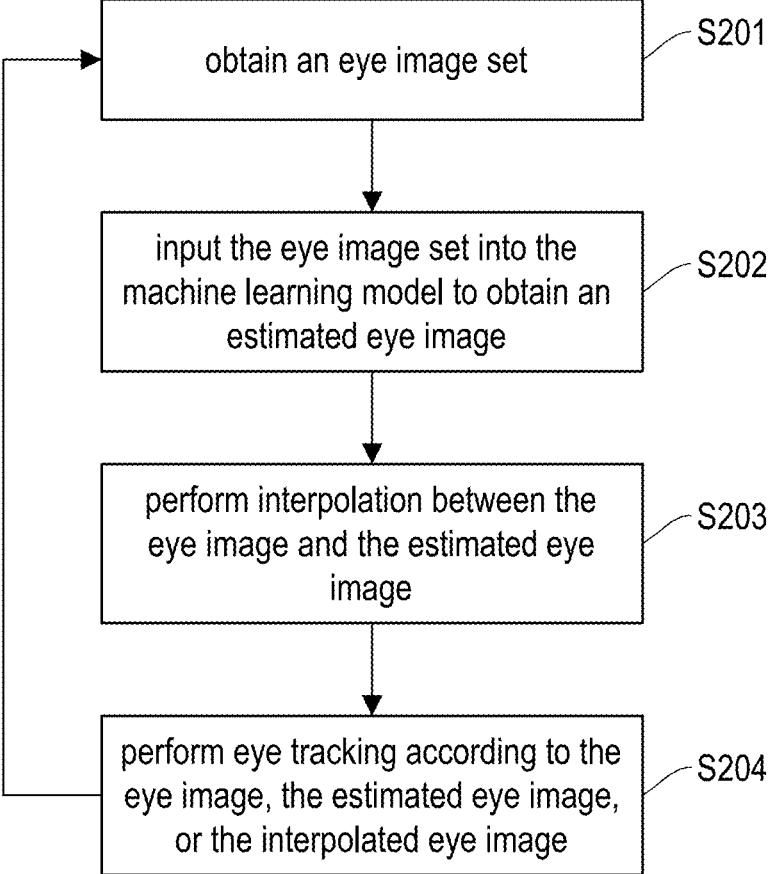
FIG. 2 illustrates a flowchart of an eye tracking operation according to one embodiment of the present invention.
Figure 3:
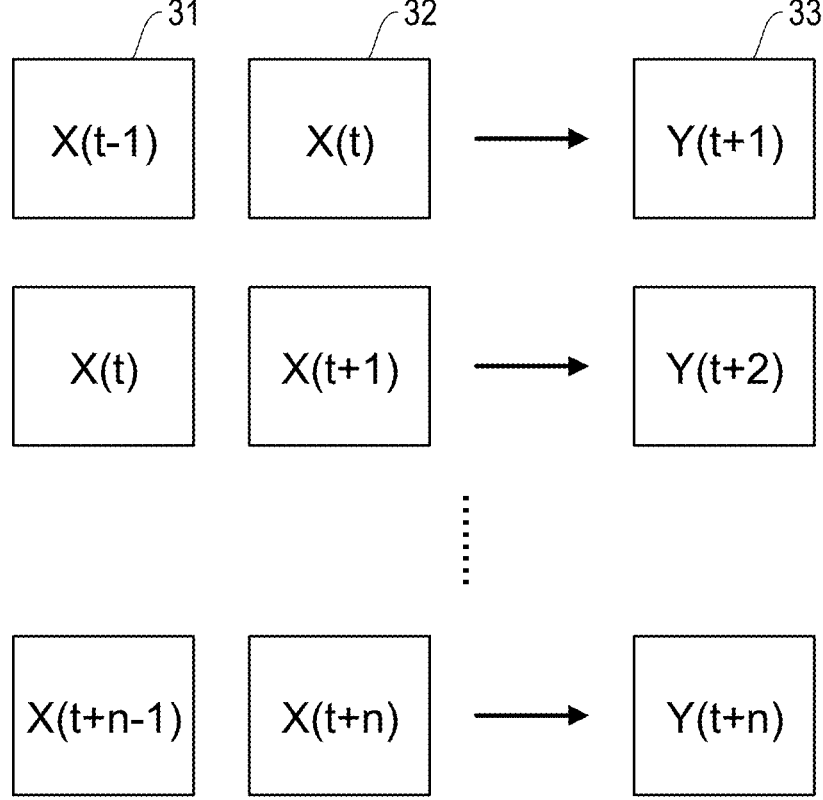
FIG. 3 illustrates a schematic diagram of eye images and estimated eye images according to one embodiment of the present invention.

FIG. 2 illustrates a flowchart of an eye tracking operation according to one embodiment of the present invention, wherein the flowchart can be implemented by the eye tracking device 100 as shown in FIG. 1. In step S201, the processor 110 may obtain an eye image set via the transceiver 130, wherein the eye image set may include one or more eye images such as eye image 31 or eye image 32 as shown in FIG. 3, wherein the time point corresponding to the eye image 31 may be earlier than the time point corresponding to the eye image 32. Take FIG. 3 as an example, if the eye image 31 is the eye image X(t−1) corresponding to time point (t−1), the eye image 32 may be the eye image X(t) corresponding to time point (t). If the eye image 31 is the eye image X(t) corresponding to time point (t), the eye image 32 may be the eye image X(t+1) corresponding to time point (t+1). If the eye image 31 is the eye image X(t+n−1) corresponding to time point (t+n−1), the eye image 32 may be the eye image X(t+n) corresponding to time point (t+n).

In step S202, the processor 110 may input the eye image set into the machine learning model to obtain an estimated eye image 33, wherein the eye image set may include actual eye images (e.g., eye imaged captured by a camera) such as eye image 31 and eye image 32. The estimated eye image 33 may correspond to a time point later than the time point of eye image 31 or time point of eye image 32. For example, the processor 110 may input the eye images X(t−1) and X(t) into the machine learning model to generate the estimated eye image Y(t+1) corresponding to time point (t+1). The processor 110 may input the eye images X(t) and X(t+1) into the machine learning model to generate the estimated eye image Y(t+2) corresponding to time point (t+2). The processor 110 may input the eye images X(t+n−1) and X(t+n) into the machine learning model to generate the estimated eye image Y(t+n+1) corresponding to time point (t+n+1).

Step S203 can be executed by the eye tracking device 100 alternatively after step S202 is complete. In step S203, the processor 110 may perform interpolation between the eye image (e.g., eye image 31 or eye image 32) and the estimated eye image (e.g., estimated eye image 33) to generate an interpolated eye image.

Figure 4:
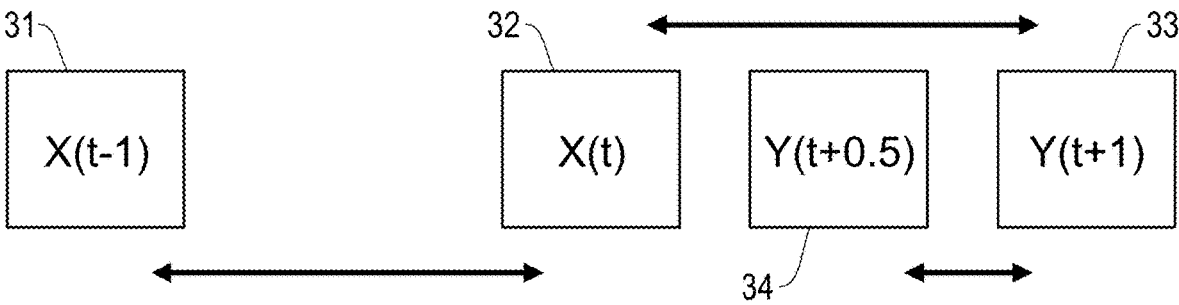
FIG. 4 illustrates a schematic diagram of an interpolated eye image according to one embodiment of the present invention.

FIG. 4 illustrates a schematic diagram of an interpolated eye image according to one embodiment of the present invention. The processor 110 may input the eye image 31 and the eye image 32 into the machine learning model to generate the estimated eye image 33. Afterward, the processor 110 may perform interpolation between the eye image 32 (or eye image 31) and the estimated eye image 33 to generate the interpolated eye image 34. The interpolated eye image 34 may correspond to a time point between the time point of the eye image 32 (or eye image 31) and the estimated eye image 33. For example, assume that the eye image 31 is the eye image X(t−1) corresponding to time point (t−1) and the eye image 32 is the eye image X(t) corresponding to time point (t). The processor 110 may input the eye image X(t−1) and eye image X(t) into the machine learning model to generate the estimated eye image Y(t+1). Afterward, the processor 110 may perform interpolation between the eye image X(t) and the estimated eye image Y(t+1) to generate the interpolated eye image Y(t+0.5), wherein the interpolated eye image Y(t+0.5) corresponds to time point (t+0.5), and time point (t+0.5) is between time point (t) and time point (t+1).

Referring back to FIG. 2. In step S204, the processor 110 may perform eye tracking according to the eye image (e.g., eye image 31 or eye image 32), the estimated eye image 33, or the interpolated eye image 34. Once step S204 is complete, the processor 110 may execute step S201 again for subsequent eye tracking.

Figure 5:
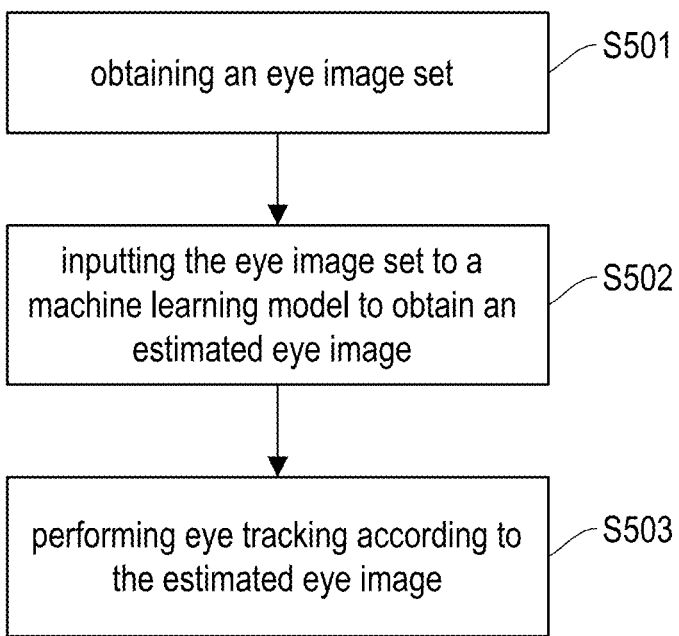
FIG. 5 illustrates a flowchart of a method for eye tracking according to one embodiment of the present invention.

FIG. 5 illustrates a flowchart of a method for eye tracking according to one embodiment of the present invention. In step S501, obtaining an eye image set. In step S502, inputting the eye image set to a machine learning model to obtain an estimated eye image. In step S503, performing eye tracking according to the estimated eye image.

In summary, the disclosed eye tracking device may collect historical eye images and use them to train a machine learning model. To enhance data diversity, the device may preprocess the historical eye images before training the model. The eye tracking device may then input an eye image set into the trained model to generate an estimated eye image, which can improve the accuracy and precision of eye tracking, and provide real-time feedback for eye tracking. Additionally, the eye tracking device may generate an interpolated eye image based on the estimated eye image, thereby increasing the frame rate of the eye image set used for eye tracking. The disclosed eye tracking device helps prevent screen lag and reduces computation resource usage while the user interacts with the system through eye tracking technology.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An eye tracking device, comprising:
a transceiver; and
a processor, coupled to the transceiver, wherein the processor is configured to:
    obtain an eye image set via the transceiver;
    input the eye image set to a machine learning model to generate an estimated eye image, wherein the estimated eye image corresponds to a time point later than a time point of the eye image set;
    perform interpolation between a first image of the eye image set and the estimated eye image to generate an interpolated eye image, wherein the interpolated eye image corresponds to a time point between a time point of the first image of the eye image set and the time point the estimated eye image; and
    perform eye tracking according to the interpolated eye image and the estimated eye image.

2. The eye tracking device according to claim 1, wherein the eye image set comprises a first eye image corresponding to a first time point and a second eye image corresponding to a second time point different from the first time point.

3. The eye tracking device according to claim 1, wherein the processor is further configured to:
    perform preprocessing on a historical eye image set before training the machine learning model according to the historical eye image set, wherein the preprocessing comprises translation, rotation, or shearing.

4. The eye tracking device according to claim 1, wherein the machine learning model comprises a neural network.

5. A method for eye tracking, comprising:
    obtaining an eye image set;
    inputting the eye image set to a machine learning model to generate an estimated eye image, wherein the estimated eye image corresponds to a time point later than a time point of the eye image set;
    performing interpolation between a first image of the eye image set and the estimated eye image to generate an interpolated eye image, wherein the interpolated eye image corresponds to a time point between a time point of the first image of the eye image set and the time point the estimated eye image; and
    performing eye tracking according to the interpolated eye image and the estimated eye image.

6. The method according to claim 5, wherein the eye image set comprises a first eye image corresponding to a first time point and a second eye image corresponding to a second time point different from the first time point.

7. The method according to claim 5, further comprising:
    performing preprocessing on a historical eye image set before training the machine learning model according to the historical eye image set, wherein the preprocessing comprises translation, rotation, or shearing.

8. The method according to claim 5, wherein the machine learning model comprises a neural network.

* * * * *